March 20, 1934.  C. B. DALE  1,951,597
BRAKE CONDITION INDICATOR
Filed July 25, 1932
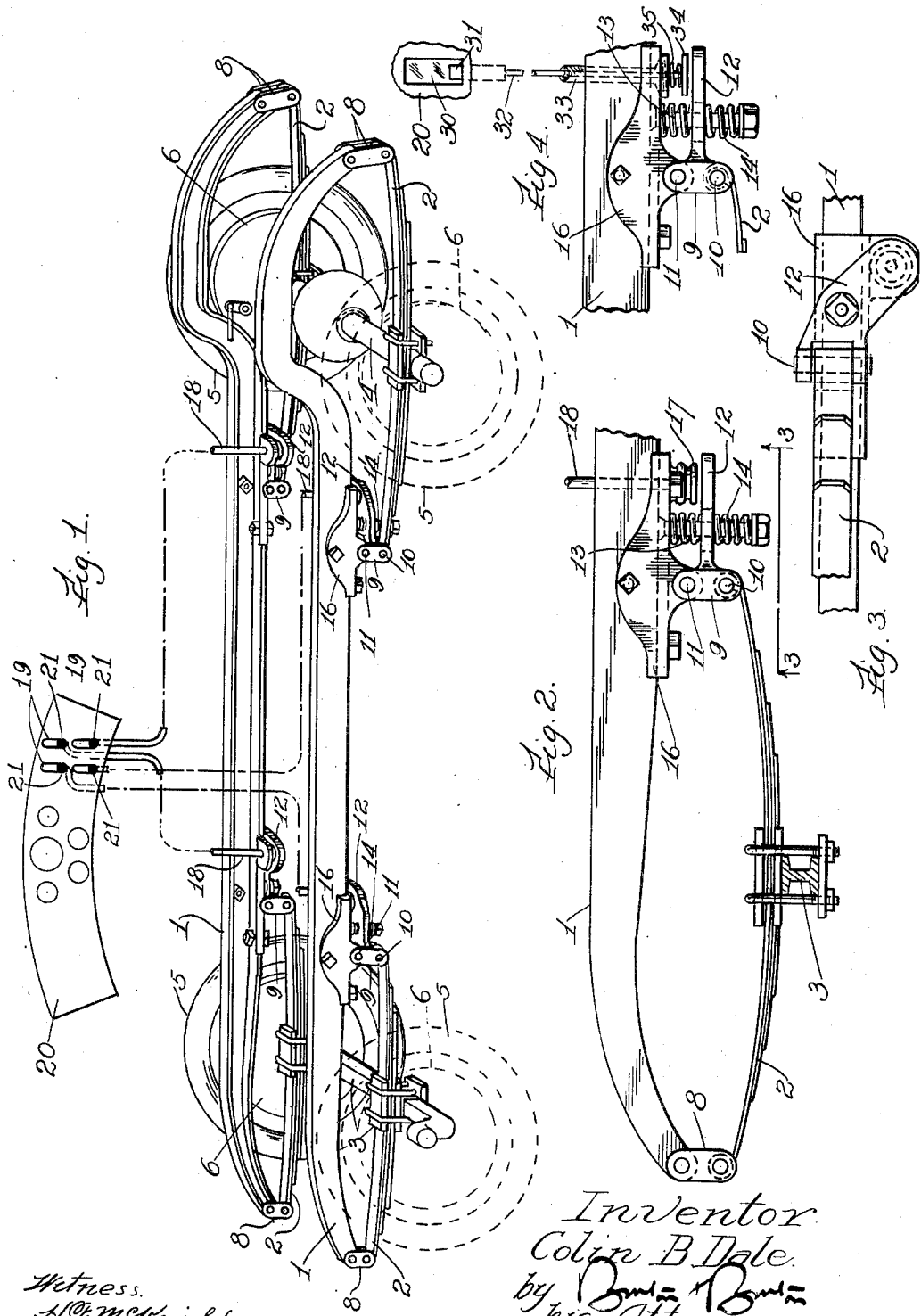
Inventor
Colin B. Dale
by his Attorneys
Witness.

Patented Mar. 20, 1934

1,951,597

UNITED STATES PATENT OFFICE 1,951,597

BRAKE CONDITION INDICATOR

Colin B. Dale, Oak Park, Ill.

Application July 25, 1932, Serial No. 624,455

15 Claims. (Cl. 116—114)

This invention relates to wheeled vehicles, and particularly to motor vehicles, such as automobiles, which are equipped with individual brake devices for the several wheels or for some of said wheels. The object of the invention is to provide means for advising the driver or operator as to the relative effectiveness of the brake devices at the several wheels, so that as occasion requires he may have them suitably adjusted. Another object of the invention is to provide an indicating device observable by the driver, and functioning while the vehicle is in motion so as to register the relative effectiveness of the several brake devices whenever the brakes are applied. The invention thus consists in the combination of certain features and elements of construction and their application to a vehicle, as herein shown and described, and as indicated by the claims.

In the drawing:

Figure 1 is a diagrammatic perspective view of the frame and running gear of a typical automotive vehicle, with the engine and body omitted, but illustrating the application of my invention to such a vehicle.

Figure 2 is a detail side elevation of one of the movable spring anchorages through which indication of the braking effect is secured.

Figure 3 is a detail view taken as a bottom plan view, as indicated at line 3—3 on Figure 2.

Figure 4 is a similar side elevation of a modified form of actuator for transmitting movement to the indicating device in view of the driver.

In road vehicles which are provided with individual braking devices associated with two or more of the wheels and operated at will through a linkage, the linkage and brake devices themselves are generally provided with adjusting means to regulate the effective pressure produced at each stage in the application of the brakes, and to permit adjustment of the brakes relatively to each other. It is desirable, of course, that the brakes on both sides of the vehicle be applied simultaneously and equally,—otherwise there is a tendency to produce a slewing or skidding of the vehicle bodily, and there is also an uneven wear of the tires when one wheel is forced to do more than its share of the braking work. Heretofore, there have been brake-testing devices in the nature of laboratory apparatus which were designed to be applied temporarily to the vehicle for determining the condition of the brakes; such devices were usually in the nature of a rack on which the vehicle was temporarily mounted for observing the braking torque at the several wheels, and the indicating means was a part of the apparatus observable only at the places where such apparatus was located. My invention makes the brake-testing mechanism a permanent part of the equipment of the vehicle, and provides indicating means which the driver may observe while the vehicle is traveling, so that he may know at all times the condition of his brakes, and may be duly warned of the need for re-adjustment.

As shown in the drawing, my invention is applied to a motor vehicle having side frame members, 1, 1, to which semi-elliptic springs, 2, are attached for connecting the axles, 3 and 4, to the frame. Each of the wheels, 5, is shown as including a brake drum, 6, which may be understood as enclosing any standard type of brake shoe and actuating mechanism designed for operation through a brake rod, 7, of which a fragment is shown extending from the drum, 6. The remainder of the brake linkage is omitted to avoid complicating the view, and since such linkages are well understood by those skilled in the art, they need not be further described.

As shown, each of the springs, 2, is connected to the frame member, 1, by the usual form of pivoted shackle, 8, and at its opposite end the spring is attached to the frame by a special anchorage member, 9, which includes a pivotal connection, 10, to the spring, and a pivotal connection, 11, to the frame. This spring mounting permits the wheels and axles to move rearwardly with respect to the frame by a limited distance in response to road drag when the brakes are applied, and I take advantage of this limited movement for securing an indication of the relative effectiveness of the brakes at the respective wheels.

The anchorage member, 9, includes a transversely extending arm, 12, which is shown projecting from the member, 9, at a point intermediate the pivots, 10 and 11, but this particular location is not important or essential. The swinging movement of the member, 9, with respect to the frame member, 1, is yieldingly resisted and checked by means of cushion springs, 13 and 14, disposed respectively above and below the arm, 12, and mounted on a stud, 15, which is fixed to the frame, 1, or to the special bracket, 16. Ordinarily, the member, 9, will act almost as a rigid anchorage bolt for the end of the spring, 2, the check springs, 13 and 14, being relatively stiff, and permitting the part, 9, to swing about its pivot, 11, only when the wheel strikes a considerable obstruction, or when the brake is applied, so that the inertia of the vehicle body tends to carry the body forward ahead of its normal position with respect to the wheels.

When this occurs upon application of the brakes, the outer end of each of the arms, 12, is swung upwardly into contact with a depressible element, 17, which, as shown in Figure 2, may be a piston or a bellows of the "sylphon" type, having interior communication with a chamber containing a fluid, which extends from the part, 17, through a tube or conduit, 18, to a sight tube or glass, 19, mounted on the dash or instrument panel, 20, of the vehicle. Pressure upon the member, 17, is transmitted to the liquid in the conduit, 18, causing it to rise in the sight tube, 19, in direct relation to the amount of drag produced at the wheel, 5, by the application of the brakes.

Normally, as shown in the drawing, the arms, 12, are spaced away from the depressible element, 17, to provide a limited range of movement for the member, 9, in response to road shocks without registration of such movement by the indicator on the instrument board, 20. However, upon application of the brakes, this limited play is quickly absorbed, and the arms, 12, are brought into contact with the element, 17, so that as soon as any considerable braking effort is applied, it will cause movement of the fluid in the several tubes, 18. As shown, the sight tubes, 19, are of substantially equal length, and the liquid indicated at 21, stands at substantially the same level in each tube when the arms, 12, are out of contact with the element, 17; but upon application of the brakes, if the braking torque is not uniform at all four wheels, the drag transmitted through the springs, 2, to the movable anchorage members, 9, will be different, and the elements, 17, will be depressed by different amounts, causing the fluid to rise to a different extent in the several sight tubes, 19. This will at once indicate to the driver which of the brakes needs adjustment to secure properly equalized action. In the case of worn brake shoes, even though the action may be equal at both wheels of either pair, or at all four wheels, the fluid, 21, in the sight tubes, 19, will not rise as far as though the brakes were in good working condition; the indicator will thus warn the driver of such a condition, even if he should not sense it from the fact that the vehicle is not retarded as promptly as it should be when the brakes are applied. The indicator also permits the driver to observe the effectiveness of employing the engine as a brake, as is frequently done in coasting down-hill with the throttle closed and with the ignition shut off; the height to which the fluid rises in the sight tubes, 19, may be compared to the height at which it stands when the regular brakes are applied.

As a slightly modified form of indicator, Figure 4 shows a sight window, 30, in a fragmentary portion of the dash or instrument board, 20, and a target member, 31, slidably mounted behind such window for movement up and down by means of a flexible wire, 32, extending through a tubular casing, 33, to the bracket, 16, where the wire terminates in a head, 34, disposed for contact with the arm, 12. A return spring, 35, is associated with the head, 34, to hold it normally at the lower limit of its movement. If the vehicle is equipped with brakes at all four wheels, the instrument board will have four of the windows, 30, corresponding to the four sight tubes, 19, shown in Figure 1, and so far as the driver is concerned, the indication thus provided will be closely similar to that afforded by the fluid, 21, in the sight tubes, 19. Preferably, in either case, the indicating devices will be grouped in pairs, corresponding to the front and rear wheels respectively.

In my Patent No. 1,577,693, dated March 23, 1926, I have shown a shock absorber associated with a vehicle spring, and operating substantially on the same principle as the anchorage members, 9, herein described. It may be understood that said anchorage members, 9, with their check springs, 13 and 14, are, in effect, shock absorbers of the type covered by my said patent, and that in accordance with the present invention they perform the additional function through the medium of the indicating device, of providing a registration of brake performance. The employment of these devices will therefore include all the advantages inherent in the shock absorber of my said patent, in addition to furnishing the driver at all times with a reliable indication of the condition of his brake equipment.

While there is shown and described herein certain specific structure embodying the invention, it will be manifest to those skilled in the art that various modifications and re-arrangements of the parts may be made without departing from the spirit and the scope of the invention, and that the same is not limited to the particular form herein shown and described, except in so far as indicated by the appended claims.

I claim:

1. In a wheeled vehicle having individual brakes for two or more of the wheels, an indicator mounted for observation from within the vehicle while it is in motion, and comprising a plurality of indicating members, means actuated by and responsive to variations in the road drag produced by the respective brakes, and actuating connections leading from said means to the respective indicating members.

2. In a wheeled vehicle including a frame and separate springs thereon adjacent each of the wheels, together with individual brakes for each said wheels, an indicator mounted for observation from within the vehicle while it is in motion, and comprising a plurality of indicating members, means associated with each of the springs respectively for response to the spring reaction resulting from the braking torque, and actuating connections leading from said means to the respective indicating members to provide for simultaneous visual comparison of the braking effect at the respective wheels.

3. In a wheeled vehicle having individual brakes for two or more of the wheels and separate springs adjacent such wheels, an indicator mounted for observation from within the vehicle, and comprising a plurality of indicating members, separate devices associated with each of said springs, responsive to the reaction of the springs to braking torque, and actuating connections leading from said devices to the respective indicating members.

4. In a wheeled vehicle including a frame and a spring adjacent a wheel, with braking means for retarding the wheel, an indicator for denoting the effectiveness of the braking means comprising an anchorage for one end of the spring normally fixed but adapted for yielding movement in response to movement of the wheel axis longitudinally of the frame, an indicating member positioned for observation from within the vehicle, and actuating connections arranged to transmit movement from said anchorage to the indicating member.

5. In a vehicle comprising supporting wheels and axles therefor, together with a frame and springs connecting the axles to the frame adjacent the wheels, individual brakes for two or more of the wheels, an anchorage for each of the springs adjacent such wheels respectively, said anchorage being normally fixed with respect to the frame, but adapted to yield in response to movement of the wheel axis longitudinally of the frame, an indicator mounted for observation from within the vehicle and comprising a plurality of indicating members with actuating connections leading respectively from said spring anchorages to the several indicating members to provide comparative indication of the braking effect at the respective wheels.

6. In a wheeled vehicle having individual brakes for two or more of the wheels, and a semi-elliptic supporting spring associated with each of said wheels, one end of each spring being connected to the vehicle frame by a pivoted shackle, the anchorage for the other end of the spring comprising a member pivotally connected to the spring end and pivotally connected to the frame, with cushion means normally preventing pivotal movement of said member at such connections, but permitting its limited movement in response to the torque produced by application of the brakes, an indicator mounted for observation from within the vehicle while it is in motion, and comprising a plurality of indicating members with actuating connections leading from said members respectively to the anchorage members for transmitting their movements to the indicator.

7. In a wheeled vehicle having individual brakes for two or more of the wheels, and a semi-elliptic spring associated with each of such wheels, a pivoted shackle connecting one end of each spring to the vehicle frame, and a member anchoring the other end of the spring to the frame, said member being pivotally connected to the spring end and pivotally attached to the frame, and having an arm checked between cushion springs which normally hold said anchorage fixed with respect to the frame, but permit slight movement thereof in response to the movement of the wheel axis longitudinally of the frame incident to application of the brakes, and an indicator mounted on the vehicle in view of the driver, comprising individual indicating members corresponding to each of the brakes, with actuating connections from said members respectively to the arms of the corresponding spring anchorage devices for transmitting their movement to the indicator to provide simultaneous registration of the braking effect at the respective wheels.

8. In a wheeled vehicle having individual brakes for two or more of the wheels, and a semi-elliptic spring associated with each of such wheels, a pivoted shackle connecting one end of each spring to the vehicle frame, and a member anchoring the other end of the spring to the frame, said member being pivotally connected to the spring end and pivotally attached to the frame, with spring means normally preventing pivotal movement of said member at such connections but allowing its limited movement in response to the braking of the wheels when the vehicle is in motion, an arm extending rigidly from said anchorage member and movable therewith, an indicator mounted on the vehicle in view of the driver comprising individual indicating members corresponding to each of the brakes, a depressible actuator associated with each of the arms of said anchorage members, said actuator being mounted on the frame in the path of movement of the arm, and a connection from each actuator to one of the indicating members for transmitting movements of the spring anchorage devices to the respective indicators.

9. In the combination defined in claim 8, said depressible actuator being normally spaced from the arm of the anchorage device to permit limited movement of the latter without registration of such movement at the indicator.

10. In the combination defined in claim 8, said indicator comprising a plurality of sight tubes with indicating fluid therein, and the actuators each including a compressible chamber with a conduit constituting a connection between each actuator and its sight tube, said fluid extending continuously through said conduit and into the chamber.

11. In a wheeled vehicle having individual brakes for two or more of the wheels, means to permit the wheels to move rearwardly with respect to the frame due to road drag when the brakes are applied while the vehicle is in motion, and means for indicating this movement mounted on the vehicle in view of the driver.

12. In combination with an automobile which includes a frame, a running gear, an engine and drive connections from the engine to the wheels, means incorporated in the running gear adapted to permit the wheels to be shifted rearwardly with respect to the frame due to road drag when the vehicle coasts with the engine operating as a brake, and means mounted in view of the driver for indicating such shifting movement of the wheels.

13. In a wheeled vehicle having individual brakes for two or more of the wheels, flexible connecting means interposed between the wheels and the frame adapted to permit the wheels to shift rearwardly due to road drag when the brakes are applied while the vehicle is in motion, said connections including spring means which yieldingly resist such shifting of the wheels; and means mounted on the vehicle in view of the driver adapted to indicate the extent by which each of the wheels shifts when the brakes are applied.

14. In combination with a wheel vehicle including a frame and a running gear, said running gear having flexible connecting means interposed between the wheels and the frame, which permits the wheels to shift rearwardly due to road drag when the brakes are applied while the vehicle is in motion; and a device on the vehicle in view of the driver connected for indicating the extent of such shifting movement.

15. In combination with a wheeled vehicle including a frame and a running gear, said running gear having flexible connecting means interposed between the wheels and the frame, which permits the wheels to shift rearwardly due to road drag when the brakes are applied while the vehicle is in motion, with spring means arranged to resist such rearward movement of the wheels; and a device on the vehicle in view of the driver connected for indicating the extent of such shifting movement.

COLIN B. DALE.